United States Patent
Cohen et al.

(10) Patent No.: US 12,192,004 B2
(45) Date of Patent: Jan. 7, 2025

(54) DEVICE AND METHOD FOR SELECTIVE RETRANSMISSION OF LOST PACKETS

(71) Applicant: HUAWEI TECHNOLOGIES CO., LTD., Shenzhen (CN)

(72) Inventors: Reuven Cohen, Hod Hasharon (IL); Ben-Shahar Belkar, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/335,755

(22) Filed: Jun. 15, 2023

(65) Prior Publication Data

US 2023/0327812 A1    Oct. 12, 2023

Related U.S. Application Data

(63) Continuation of application No. PCT/EP2020/086128, filed on Dec. 15, 2020.

(51) Int. Cl.
  *H04L 1/1809*  (2023.01)
  *H04L 1/1607*  (2023.01)

(52) U.S. Cl.
  CPC .......... *H04L 1/1809* (2013.01); *H04L 1/1628* (2013.01)

(58) Field of Classification Search
  None
  See application file for complete search history.

(56) References Cited

U.S. PATENT DOCUMENTS

| | | | |
|---|---|---|---|
| 5,222,061 A | 6/1993 | Doshi et al. | |
| 2008/0175186 A1* | 7/2008 | Liu | H04L 1/1874 370/320 |
| 2010/0058138 A1 | 3/2010 | Gerendai et al. | |

(Continued)

FOREIGN PATENT DOCUMENTS

| | | | |
|---|---|---|---|
| CN | 105827374 A | * | 8/2016 |
| EP | 1204249 A1 | | 5/2002 |

OTHER PUBLICATIONS

Blanton et al., "A Conservative Loss Recovery Algorithm Based on Selective Acknowledgment (SACK) for TCP," Internet Engineering Task Force (IETF), Request for Comments: 6675, Total 15 pages (Aug. 2012).

(Continued)

*Primary Examiner* — Guerrier Merant
(74) *Attorney, Agent, or Firm* — Leydig, Voit & Mayer, Ltd.

(57) ABSTRACT

The present disclosure relates to protocols for efficiently retransmitting lost data in a communication network. To this end, the disclosure proposes a first network device including processing circuitry configured to transmit a sequence of data packets to a second network device, receive at least one notification message from the second network device, and retransmit missing data packets as a next step after receiving the at least one notification message. The at least one notification message is indicative of both (i) a largest sequence number L of a data packet received at the second network device and (ii) one or more data packets that are missing from the sequence up to L at the second network device. Each missing data packet is indicated as a missing data packet after its first transmission, and a sequence number X of each missing data packet is less than L−K.

11 Claims, 14 Drawing Sheets

(56) References Cited

U.S. PATENT DOCUMENTS

2014/0129893 A1  5/2014  Rigaudeau et al.
2018/0295555 A1* 10/2018  Xiong .................. H04L 47/267

OTHER PUBLICATIONS

"3rd Generation Partnership Project (3GPP); Technical Specification Group (TSG) RAN; Working Group 2 (WG2); RLC Protocol Specification (3G TS 25.322 version 1.1.0)," 3G TS 25.322 V1.1.0, pp. 1-68, 3rd Generation Partnership Project, Valbonne, France (Jun. 1999).
"Broadband ISDN; B-ISDN ATM Adaptation Layer—Service Specific Connection Oriented Protocol (SSCOP)," ITU-T Telecommunication Standardization Sector of ITU, ITU-T Recommendation Q.2110, Total 99 pages, International Telecommunication Union, Geneva, Switzerland (Jul. 1994).
Javatpoint, "Go-Back-N ARQ," https://www.javatpoint.com/go-back-n-arq, Total 20 pages (Retrieved on Apr. 21, 2023).
W. Bux et al., "Performance of an improved data link control protocol," iccc, Total 1 page (1988). With an English abstract only.

* cited by examiner

1400

1401 Receive a sequence of data packets from a first network device;

1402 Transmit at least one notification message, to the first network device, wherein the at least one notification message is indicative of the largest sequence number L of a data packet among sequence numbers of data packets that have been received at the second network device and one or more data packets of the sequence of data packets that are missing at the second network device up to the largest sequence number L.

FIG. 14

DEVICE AND METHOD FOR SELECTIVE RETRANSMISSION OF LOST PACKETS

CROSS-REFERENCE TO RELATED APPLICATIONS

This application is a continuation of International Application No. PCT/EP2020/086128, filed on Dec. 15, 2020, the disclosure of which is hereby incorporated by reference in its entirety.

TECHNICAL FIELD

The present disclosure relates to communication networks, and more particularly to data reliability in data transmission of communication networks. The disclosure proposes a device and method for selective retransmission of lost packets.

BACKGROUND

In data networks, when two computers communicate with each other, it is often necessary to ensure data reliability. To this end, the sender attaches a sequence number to each data packet and the receiver informs the sender which data packets have been received and which data packets are missing. The sender must retransmit the missing data packets until the receiver receives all data packets.

Protocols for ensuring data reliability can be classified into three main categories: Stop-and-Wait, go-back-N and Selective-Repeat.

In Stop-and-Wait the sender sends the packet and waits for the acknowledgement (ACK) of the packet. Once the ACK reaches the sender, it transmits the next data packet. If the ACK is not received, it re-transmits the previous data packet again.

In go-back-N, a receiver that has received all data packets up to packet number N is willing to accept only packet number N+1. If packet N+1 is not received, but a packet with a higher sequence number is received, e.g., N+2 or higher, the receiver drops this out-of-order packet. When the sender is informed that data packet N+1 was lost, it knows that it must retransmit not only this data packet, but also all succeeding packets.

In Selective-Repeat, the receiver is willing to accept packets that are received out of order. The receiver places these packets in a reordering buffer, or directly places them if direct data placement (DDP) headers exist. It then informs the sender only about missing packets, and the sender retransmits only the missing packets.

However, the existing solutions of missing packet retransmission suffer from one or more of the following problems. In some solutions, the sender is informed multiple times about a missing packet, and may retransmit a missing packet more than necessary. Some solutions require many logical timers, and the operation is difficult. Adjusting the time-out is a very difficult task, especially because a round-trip-time (RTT), i.e., the time between sending a packet and receiving an ACK for it, may vary very often. Wrong estimation of the RTT may result either in an unnecessary retransmission (if the time-Out is too short), or an extra delay (if the time-Out is too long).

SUMMARY

In view of the above-mentioned limitations, embodiments of the present disclosure aim to introduce a new protocol for efficiently retransmission of lost packets, particularly for selective retransmission of lost packets. An objective is to allow the sender to retransmit only lost packets, without relying on a per-packet timer and without waiting for a long time-out if the first retransmission does not succeed.

The objective is achieved by embodiments as provided in the enclosed independent claims. Advantageous implementations of the embodiments are further defined in the dependent claims.

A first aspect of the disclosure provides a first network device, configured to: transmit a sequence of data packets to a second network device; receive at least one notification message, from the second network device, wherein the at least one notification message is indicative of a largest sequence number L of a data packet among sequence numbers of data packets that have been received at the second network device and one or more data packets of the sequence of data packets that are missing at the second network device up to the largest sequence number L; and retransmit one or more data packets as the next step after receiving the at least one notification message, wherein each of the one or more missing data packet is indicated as a missing data packet after its first transmission by the at least one notification message, and a sequence number X of the each missing data packet is less than $L-K$, where K is a parameter that is a non-negative integer.

The first network device (sender), by being configured to immediately retransmit a data packet, if a data packet is indicated as missing packet for the first time, is able to selectively and efficiently retransmit missing packets. That is, a packet indicated by the receiver as missing after its first transmission is immediately retransmitted by the sender. The at least one notification message may comprise at least one of an ACK, a negative-acknowledgment (NACK), or a selective acknowledgment (SACK).

In particular, in an in-order packet routing case, when the first network device is informed that a packet L has been received by the second network device (receiver), but a packet X (where $X<L$) is not, the first network device knows that the packet X is missing. In some cases, the network does not necessarily ensure in-order packet routing. In this implementation, the proposed protocol may be modified accordingly, by introducing the parameter K.

In particular, the first network device may maintain the parameter K, which indicates how many packets can bypass a certain packet when they are all sent from the first network device to the second network device. For addressing a scenario that data packets are not routed in order, the parameter K is a positive integer. For instance, if K=3, only when $X<L-3$, the first network device can determine that packet number X is missing after receiving packet number L. It should be noted that in the case of K=0, the solution is for addressing an in-order packet routing; namely, packets do not bypass each other in the network.

In an implementation form of the first aspect, the first network device is configured to maintain a first data structure that is indicative of the missing data packets that are indicated by the at least one notification message; and update the first data structure in response to the at least one notification message.

Optionally, the first data structure may be a bitmap that indicates a status of every outstanding packet (i.e., every transmitted packet that was not confirmed by the second network device). This is to remember which packet has been accepted by the receiver and which is not.

In an implementation form of the first aspect, the first network device is configured to maintain a second data structure that is indicative of to-be-retransmitted data packets; and remove a to-be-retransmitted data packet from the second data structure after retransmitting the to-be-retransmitted data packet.

Optionally, the first network device may maintain another data structure other than the first data structure. In particular, the second one is to remember which packet has to be retransmitted (the to-be-retransmitted set). Notably, when a packet is retransmitted, it will be removed from the to-be-retransmitted set (i.e., not in the second data structure anymore); but before it is acknowledged as received by the receiver, it is still marked as missing (i.e., still in the first data structure).

In an implementation form of the first aspect, the first network device is further configured to add the one or more data packets into the second data structure, if the one or more data packets are indicated as missing data packets after its first transmission by the at least one notification message, and the sequence number X of the each missing data packet is less than L–K.

Notably, if the first network device determines that the first transmission of a data packet fails, the data packet will be put in the second data structure. To determine the data packet is missing, the sequence number of the data packet should meet the condition as previously discussed.

In an implementation form of the first aspect, the first network device is further configured to add the one or more data packets into the second data structure, if the following conditions are fulfilled:
the one or more data packets have been retransmitted,
a further notification message is received by the first network device, wherein the further notification message is indicative of the one or more data packets still being missing at the second network device,
the further notification message is also indicative of a further data packet that has been received at the second network device, wherein the further data packet was sent for the first time after the last retransmission of the one or more data packets, and
the further data packet indicated by the further notification message has a sequence number that is not less than Y+K, wherein Y is a sequence number of a first data packet that is sent for the first time after the last retransmission of the one or more data packets.

Notably, for packets that have been retransmitted by the first network device, the second network device may still report that they are missing before they are arrived at the second network device. To avoid unnecessary redundant retransmission, the first network device checks for other conditions, i.e., as described in the previous paragraph, and may only retransmit them again if these conditions are met.

In an implementation form of the first aspect, the first network device is configured to operate in a first state and in a second state, wherein in the first state, the first network device is configured to transmit new data packets; wherein in the second state, the first network device is configured to retransmit the missing data packets according to the second data structure.

According to embodiments of the protocol, at the sender side, i.e., at the first network device, the timeline can be divided into rounds. Each round is either a "regular round" where new packets are transmitted, or a "retransmission round" where lost packets are retransmitted according to the second data structure.

In an implementation form of the first aspect, wherein in the first state, the first network device is configured to: enter the second state, if the second data structure is not empty; and/or stay in the first state, if the second data structure is empty.

That is, in a "regular round", when the second network device informs the first network device for the first time that a packet is lost, this packet will be added into the second data structure immediately. Then, the first network device will immediately retransmit this packet, since the second data structure is not empty. There is no risk that this retransmission is spurious because there are no outstanding copies of this packet in the way to the receiver.

In an implementation form of the first aspect, in the second state, the first network device is configured to enter the first state if the second data structure is empty, and/or stay in the second state, if the second data structure is not empty.

That is, after the first network device retransmits all data packets that are known to be missing, the first network device will continue to transmit new data packets.

In an implementation form of the first aspect, the first network device is further configured to: use a timer, and set the timer when transmitting a data packet and/or when retransmitting a missing data packet; and add all data packets for which an ACK was not received to the second data structure, when the timer expires.

Optionally, the first network device may decide that a new retransmission round may be started by using a time-out. When the timer expires, the first network device retransmits all the data packets for which an ACK has not been received so far. In particular, as previously described, the notification message may contain ACKs and NACKs. Notably, an ACK indicates that a packet has been received, while a NACK indicates that a packet is missing at the receiver.

In an implementation form of the first aspect, the first network device is further configured to set the timer with a value greater than an RTT.

Notably, RTT refers to a time between sending a packet and receiving an ACK for that packet.

A second aspect of the disclosure provides a second network device, being configured to receive a sequence of data packets from a first network device; and transmit at least one notification message, to the first network device, wherein the at least one notification message is indicative of the largest sequence number L of a data packet among sequence numbers of data packets that have been received at the second network device and one or more data packets of the sequence of data packets that are missing at the second network device up to the largest sequence number L.

The second network device (receiver) receives data packets and transmits notification messages (e.g., ACK(s) and/or NACK(s)) accordingly, to allow the first network device (sender) to retransmit missing packets in an efficiently manner.

In an implementation form of the second aspect, the second network device is further configured to transmit the at least one notification message to the first network device, when a timer expires.

Notably, the receiver may also have a timer, which triggers the transmission of a notification message if a certain number of packets are not received within a time-out period.

A third aspect of the disclosure provides a method performed by a first network device, wherein the method comprises: transmitting a sequence of data packets to a second network device; receiving at least one notification message, from the second network device, wherein the at least one notification message is indicative of a largest sequence number L of a data packet among sequence numbers of data packets that have been received at the second network device and one or more data packets of the sequence of data packets that are missing at the second network device up to the largest sequence number L; and retransmitting one or more missing data packets as the next step after receiving the at least one notification message, wherein each of the one or more missing data packet is indicated as a missing data packet after its first transmission by the at least one notification message, and a sequence number X of the each missing data packet is less than L–K, where K is a parameter that is a non-negative integer.

Implementation forms of the method of the third aspect may correspond to the implementation forms of the first network device of the first aspect described above. The method of the third aspect and its implementation forms achieve the same advantages and effects as described above for the first network device of the first aspect and its implementation forms.

A fourth aspect of the disclosure provides a method performed by a second network device, wherein the method comprises: receiving a sequence of data packets from a first network device; and transmitting at least one notification message, to the first network device, wherein the at least one notification message is indicative of the largest sequence number L of a data packet among sequence numbers of data packets that have been received at the second network device and one or more data packets of the sequence of data packets that are missing at the second network device up to the largest sequence number L.

Implementation forms of the method of the fourth aspect may correspond to the implementation forms of the second network device of the second aspect described above. The method of the fourth aspect and its implementation forms achieve the same advantages and effects as described above for the second network device of the second aspect and its implementation forms.

A fifth aspect of the disclosure provides a computer program product comprising a program code for carrying out, when implemented on a processor, the method according to the third aspect and any implementation forms of the third aspect, or the fourth aspect and any implementation forms of the fourth aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which
FIG. 14 shows a method according to an embodiment of the disclosure.

DETAILED DESCRIPTION OF EMBODIMENTS

Illustrative embodiments of methods, devices, and program product for efficient packet retransmission in a communication system are described with reference to the figures. Although this description provides a detailed example of possible implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

As previously discussed, protocols for ensuring data reliability can be classified into three main categories: Stop-and-Wait, go-back-N and Selective-Repeat.

For example, a sender sends packets 1-5, and only packet number 3 is lost. In a go-back-N scenario, the sender will retransmit packets 3-5, while in a Selective-Repeat scenario, the sender will retransmit only packet number 3.

Figure 1:
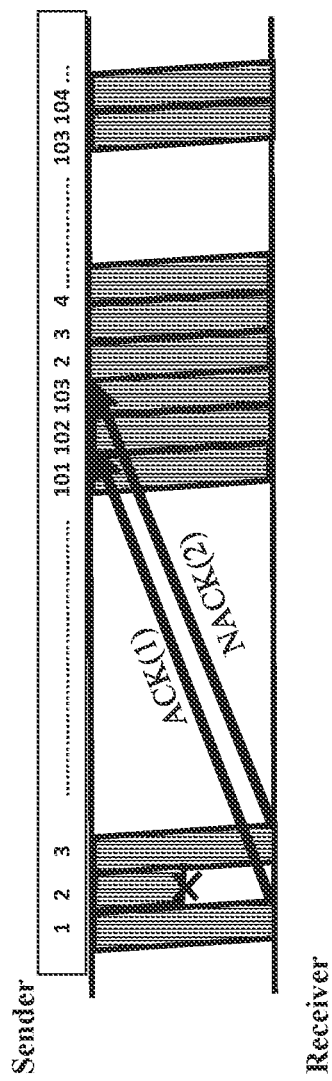
FIG. 1 shows an example of go-back-N approach.

FIG. 1 shows a case where in go-back-N, the sender sends 103 packets before it is informed by a negative ACK (NACK) that packet 2 is missing. The sender therefore may retransmit not only packet 2, but also packets 3-103. Only after that, the sender can continue transmitting new packets (from 104 and up).

Figure 2:
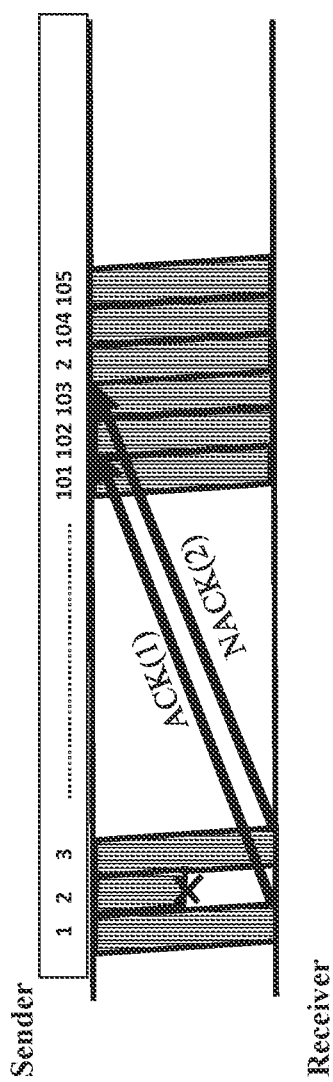
FIG. 2 shows an example of Selective-Repeat approach.

An example depicted in FIG. 2 shows a similar situation, but with Selective-Repeat. Here, when the sender is informed that packet number 2 is missing, it retransmits only this packet (i.e., packet number 2), and then it can continue transmitting new packets.

Notably, Selective-Repeat is a more efficient protocol, since only packets that fail to reach the receiver are retransmitted. However, the implementation of Selective-Repeat is more difficult than that of go-back-N, for two main reasons. The first is that Selective-Repeat requires the receiver to store out-of-order packets, or on other cases ask for additional DDP header. The second is that informing the sender, which packets have been received and which are missing, is a difficult task in an asynchronous and unreliable network. In particular, it is possible that the receiver informs the sender that a packet is missing, while a (re)transmission of this packet is on its way and will reach the receiver quite soon. Thus, a Selective-Repeat sender always has the difficulty of deciding whether or not to obey a retransmission request.

Figure 3:
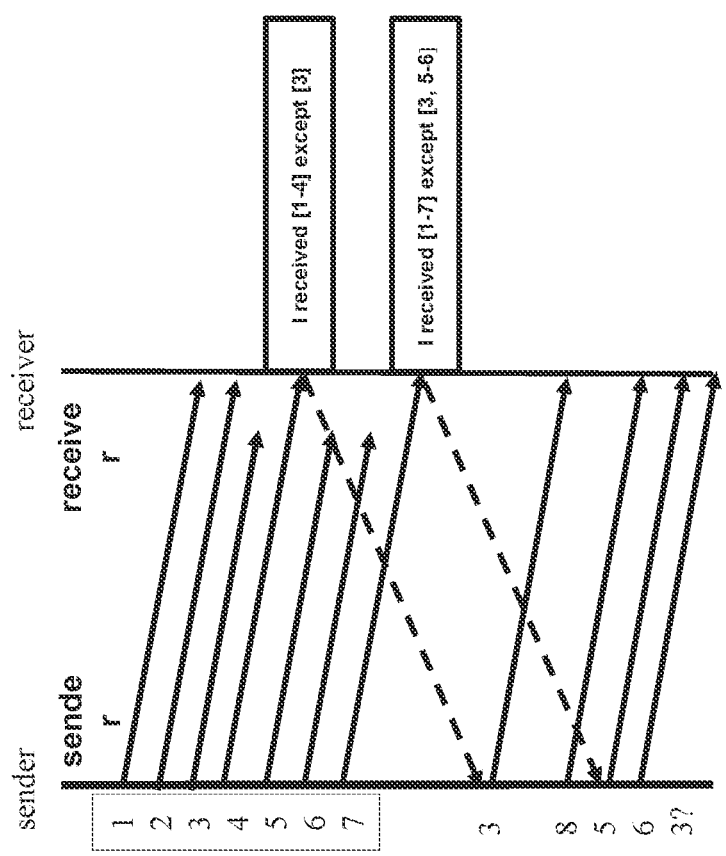
FIG. 3 shows an ambiguity problem of Selective-Repeat approach.
Figure 4:
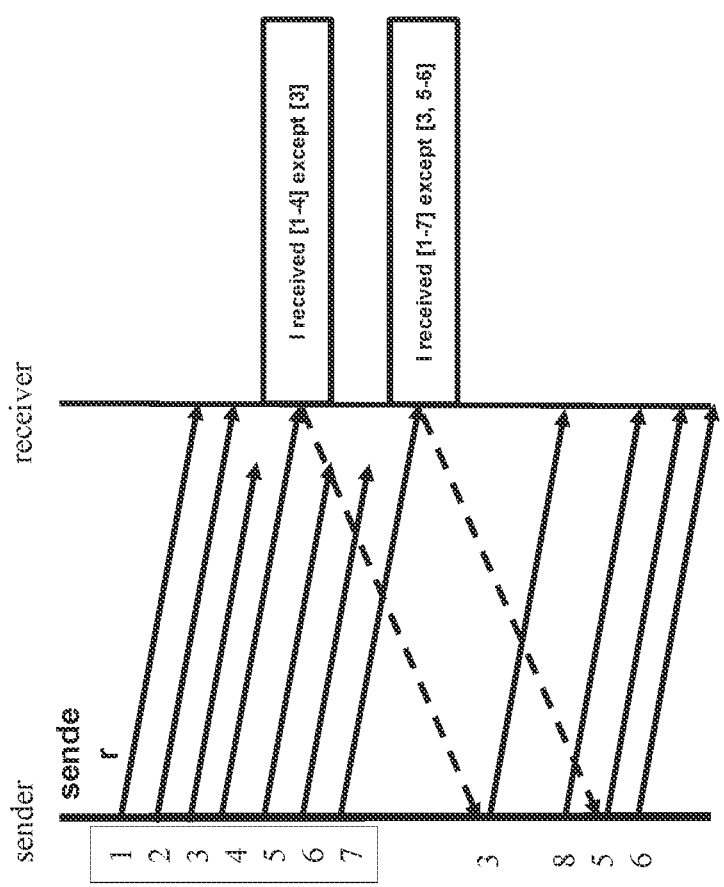
FIG. 4 shows an example of Selective-Repeat approach.

For example, a situation is as shown in FIG. 3. In particular, after receiving packet 4, the receiver understands that packet 3 is lost, because if it was not lost it should have been received before packet 4. The receiver may inform the sender of this. It could send a NACK, optionally the receiver may inform the sender about all the packets it has received and the packet it has not received in one notification message.

When the sender receives this notification message, it retransmits packet number 3. But sometime later it receives another notification message, which indicates that packets 5-6 are also lost. This further notification message also informs that packet 3 is (still) missing. When the sender receives this further notification message, it does not know what the status of the retransmitted copy of packet 3 is. On one hand, if it ignores the fact that this further notification message indicates that packet 3 is (still) missing, then it would never be able to know that the retransmitted copy of packet 3 is lost. On the other hand, if it retransmits packet 3 once again, but the previous retransmission was received by the receiver, then this second retransmission is a waste of resources.

One way to address the above problem is that each the sender always obey the first retransmission request for any packet. But once the sender retransmits a packet, it starts a timer and if this timer expires before an ACK is received for this packet, the packet is retransmitted again.

Figure 5:
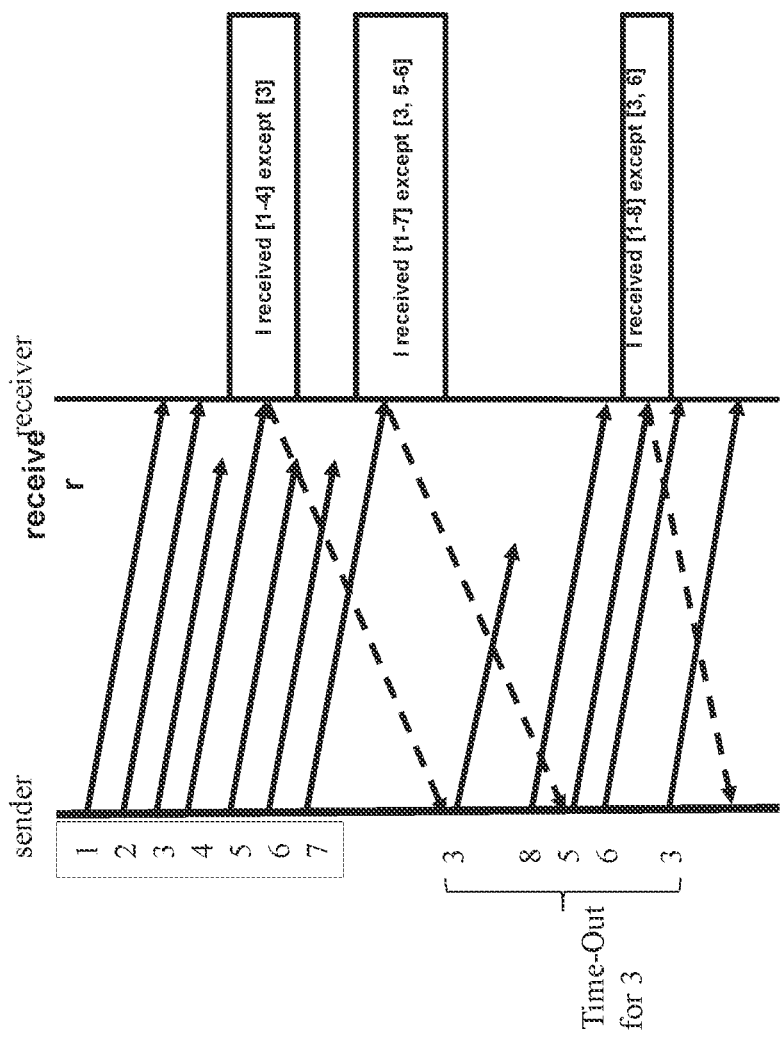
FIG. 5 shows an example of Selective-Repeat approach.

In this case, the sender will always retransmit a packet as a response to a NACK. But if the retransmission is lost, the only way for the sender to know about the loss is to associate a timer with each retransmission. If this retransmission is not ACKed within a timeout period, it is retransmitted again. This is shown in FIG. 5. It should be note that FIG. 5 does not show all notification messages that are sent or can be sent. In this figure, the second retransmission of packet 3 is done following a timeout.

However, there are two problems with the above approach. First, it requires many logical timers. The operation of these timers is difficult, especially when implementing the protocol on hardware. Second, the protocol needs to adjust the time-out, which is a very difficult task. This is especially because an RTT may vary very often in practice. Wrong estimation of the RTT may result either in an unnecessary retransmission (in case the time-out is too short), or in extra delay (in case the time-out is too long).

To address the aforementioned limitations and deficiencies, embodiments of this disclosure propose a new protocol for selective retransmission of lost packets. This protocol is called Light Efficient Retransmission Protocol (LERP). One of the most important property of LERP is that it allows the sender to retransmit only lost packets, without relying on a per-packet timer and without waiting for a long time-out if the first retransmission does not succeed.

Figure 6:
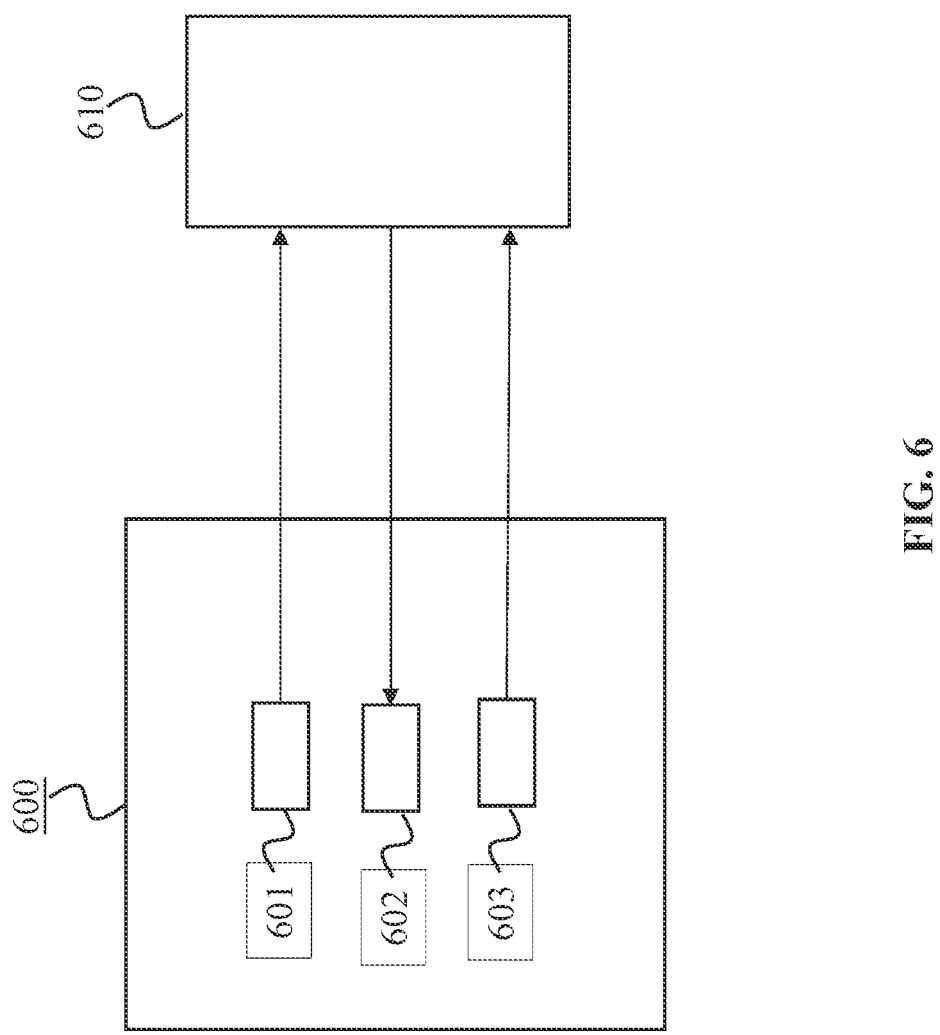
FIG. 6 shows a first network device according to an embodiment of the disclosure.

FIG. 6 shows a first network device 600 according to an embodiment of the disclosure. The first network device 600 may comprise processing circuitry (not shown) configured to perform, conduct or initiate the various operations of the first network device 600 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The first network device 600 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the first network device 600 to be performed. In one embodiment, the processing circuitry comprises one or more processors and a non-transitory memory connected to the one or more processors. The non-transitory memory may carry executable program code which, when executed by the one or more processors, causes the first network device 600 to perform, conduct or initiate the operations or methods described herein.

In particular, the first network device 600 is configured to transmit a sequence of data packets 601 to a second network device 610. Thus, the first network device 600 may be referred to as "sender" and the second network device 610 as "receiver", particularly in comparison with the sender and receiver shown in the previous figures. The first network device 600 is further configured to receive at least one notification message 602 from the second network device 610. In particular, the at least one notification message 602 is indicative of a largest sequence number L of a data packet among sequence numbers of data packets that have been received at the second network device 610 and one or more data packets 603 of the sequence of data packets that are missing at the second network device 610 up to the largest sequence number L. Then, the first network device 600 is particularly configured to retransmit one or more data packets 603 as the next step after receiving the at least one notification message 602, wherein each of the one or more missing data packet 603 is indicated as a missing data packet after its first transmission by the at least one notification message 602, and a sequence number X of the each missing data packet 603 is less than L−K, where K is a parameter that is a non-negative integer.

That is, when the receiver, i.e., the second network device 610, informs the sender, i.e., the first network device 600, for the first time that a packet is lost (by using the at least one notification message 602), the first network device 600 can immediately retransmit this packet, if a sequence number X of the each missing data packet 603 is less than L−K. There is no risk that this retransmission is spurious because there are no outstanding copies of this packet in the way to the second network device 610. Notably, as previously discussed, a packet is missing at the receiver may be indicated by a NACK. The at least one notification message 602 may comprise ACKs, and/or NACKs. An ACK may indicate that a certain packet has been received by the second network device 610, and a NACK may indicate that a certain packet is missing at the second network device 610. Thus, the problem of deciding when to obey to a NACK and when not is relevant only after a packet is retransmitted, and the first network device 600 keeps receiving NACKs for this packet, as is the case for packet 3 as shown in FIG. 3.

An idea of the proposed protocol is, that when the sender, i.e., the first network device 600, retransmits a packet, e.g., packet X, X being a sequence number of the packet, it remembers a sequence number of the last packet (e.g., packet Y) transmitted for the first time, i.e., Y. Taking a scenario in which K=1 as an example, when the first network device 600 receives an ACK for a packet whose sequence number is larger than Y, it knows that by that time it should have received an ACK for the retransmitted copy of packet X. If such ACK was not received, the retransmitted copy of packet X must have been lost, and packet X may be retransmitted again.

Notably, the at least one notification message 602 may comprise at least one of an ACK, a NACK, or a SACK. Notably, the SACK may indicate which packets in a set of packets are acknowledged (either negatively or positively).

In particular, in an in-order packet routing case, when the first network device 600 is informed that a packet L has been received by the second network device 610 (receiver), but a packet X (where X<L) is not, the first network device 600 knows that the packet X is missing. However, the network does not necessarily ensure in-order packet routing, thus the proposed protocol introduces the parameter K, which indicates how many packets can bypass a certain packet when they are all sent from the first network device to the second network device.

Notably, in the case of K=0, the solution is for addressing the in-order packet routing. For addressing a scenario that data packets are not routed in order, the parameter K is a positive integer. For instance, if K=3, only when X<L−3, the first network device can determine that packet X is missing.

The protocol at the sender side, i.e., the first network device 600, may divide the timeline into rounds. Each round is either a "regular round" where new packets are transmitted, or a "retransmission round" where lost packets are retransmitted. This is demonstrated by FIG. 7. A variable StampedMaxDataTx is defined. This variable may be used for remembering the last regular (not retransmitted) transmitted packet before entering a retransmission round.

Figure 7:
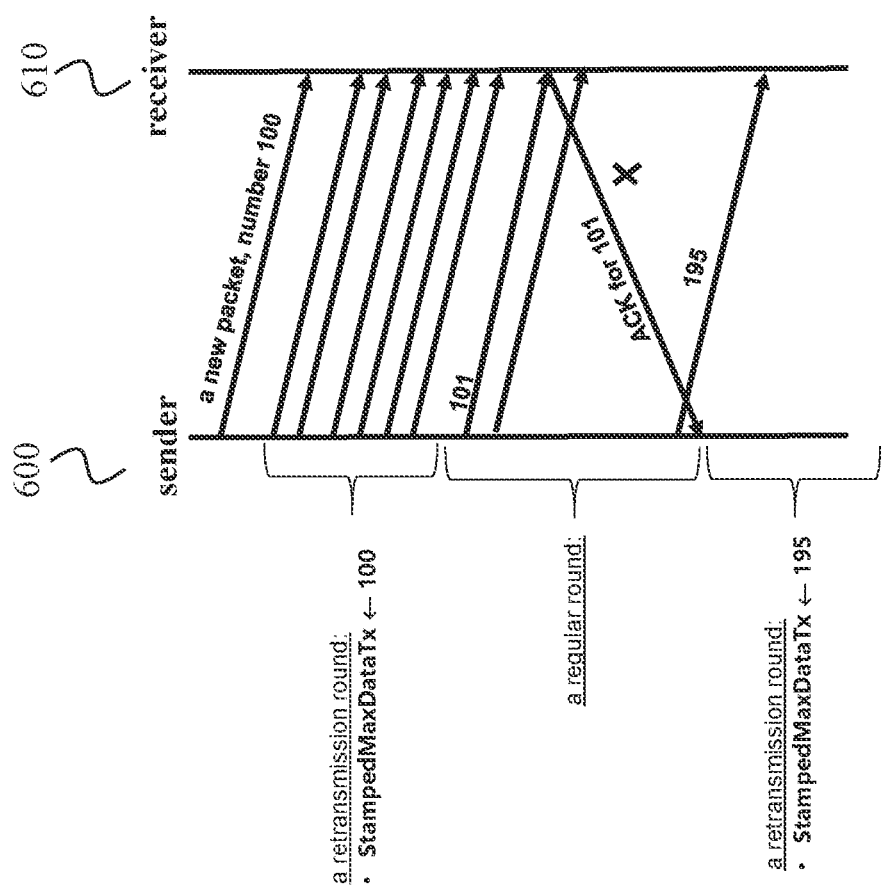
FIG. 7 shows an example of Light Efficient Retransmission Protocol (LERP) according to an embodiment of the disclosure.

FIG. 7 shows an example of the proposed protocol, according to an embodiment of the disclosure. It should be note that in this specific embodiment, it is assumed that K=0. In particular, in last regular round, a new packet 100 is transmitted by a sender to a receiver. The sender may be the first network device 600 as shown in FIG. 6, and the receiver may be the second network device 610 as shown in FIG. 6. In a retransmission round, only lost packets are transmitted. Further, the variable StampedMaxDataTx is set to 100, since the packet 100 is the last regular (not retransmitted) transmitted packet. After retransmitting lost packets, a regular round starts, in which new packets are transmitted. New losses will be fast-retransmitted. That is, when the first network device 600 knows that a packet is reported as missing packet for the first time, the first network device 600 will retransmit that packet immediately. In this case, when receiving a NACK for packet 101, or not receiving an ACK for 101, or receiving a notification message notifying that packet 101 is lost, the first network device 600 enters a "retransmission round". Following the fast retransmission, StampedMaxDataTx will be updated. As shown in this example, at next retransmission round, only lost packets are transmitted, and the variable StampedMaxDataTx is set to 195.

Figure 8:
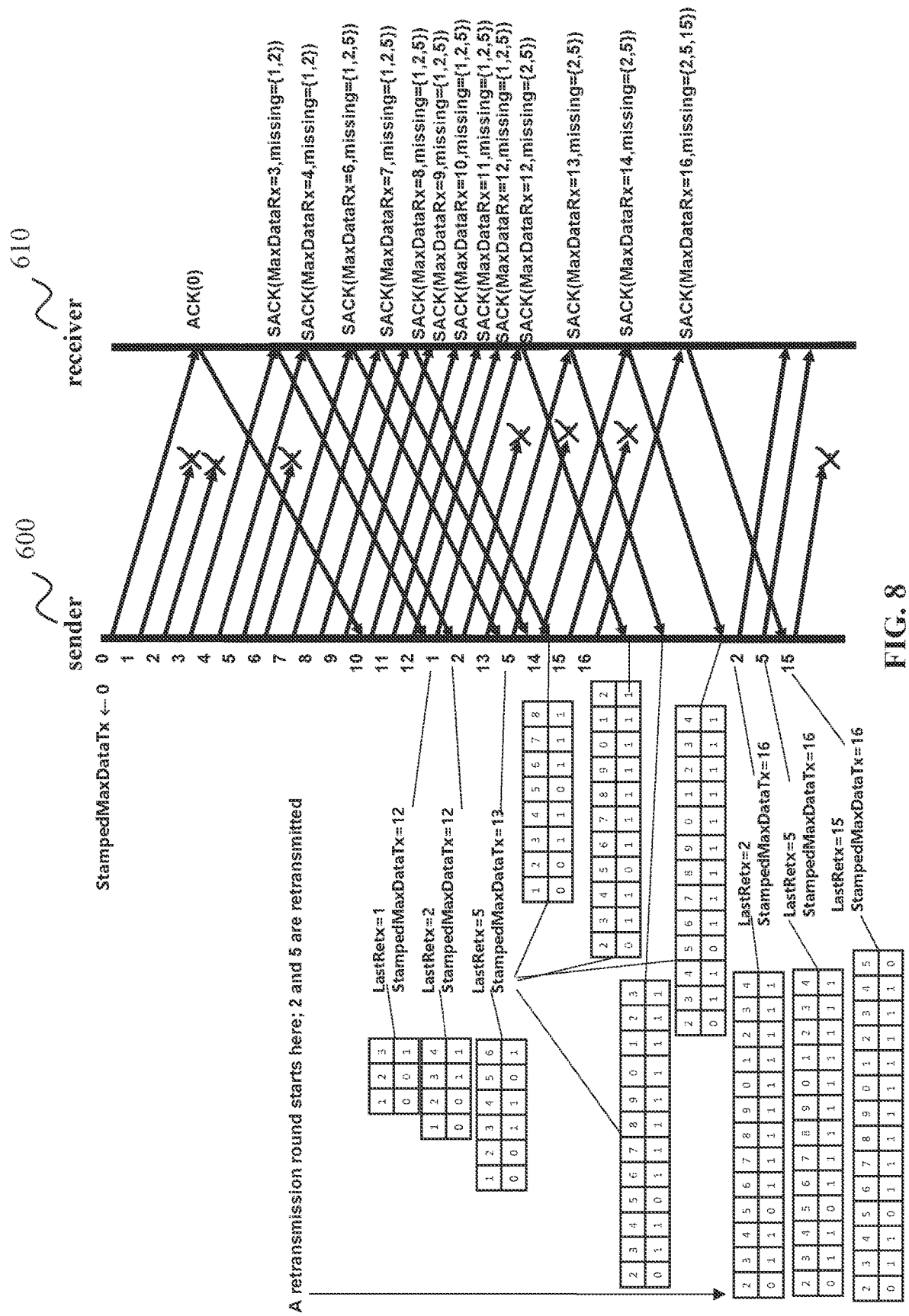
FIG. 8 shows an example of LERP according to an embodiment of the disclosure.

FIG. 8 shows a LERP execution example according to an embodiment of the disclosure. It is assumed that K=0 in this embodiment. The sender shown in FIG. 8 may be the first network device 600 as shown in FIG. 6, and the receiver may be the second network device 610 as shown in FIG. 6.

In this example, packet(0) is correctly received and an ACK(0) is sent back by the receiver. Then, packet(1) and packet(2) are lost. When packet(3) is received, the receiver understands that packet(1) and packet(2) were lost. It may send a notification message saying that all the packets have been correctly received till packet number 3, but without packet(1) and packet(2). It is worth mentioning that a "SACK" is used in this figure (and FIG. 9, FIG. 10) merely as an example to represent a notification message. The receiver, i.e., the second network device 610, may send other notification messages such as ACKs or NACKs as well.

This SACK is the first SACK sent by the receiver. When the sender receives this SACK, it may build a retransmission dataset (a bitmap in this example), which indicates what packets are missing. It also starts the first retransmission round: StampedMaxDataTx is set to 12 (the last packet sent in order) and another variable LastRetx indicates which missing packet is the next to be retransmitted. In this case, packet(1) and packet(2) are retransmitted. Then, the first retransmission round ends, and the sender continues transmitting regular packets.

Only regular packet(13) is transmitted when a SACK reporting the loss of packet(5) is received. The sender enters a new retransmission round, but in this round not all the lost packets are retransmitted, because the sender does not know if the retransmission of packet(1) and packet(2) was successful. The sender sets StampedMaxDataTx to 13 and retransmit packet(5). Then the sender exits the retransmission round and continues transmitting regular packets, the first of which is packet(14). When the SACK for this packet is received, it tells the sender that packet(14) is OK, and that packet(2) and packet(5) are still missing. Since StampedMaxDataTx=13 and 14>13, the sender knows that by this all the retransmissions should have been received. Since packet(2) and packet(5) are still reported missing, this means that a new retransmission round can start and these packets should be retransmitted for the second time (i.e., transmitted in the third round). The sender sets StampedMaxDataTx=16 and retransmit packet(2) and packet(5). The sender then wants to switch to transmitting regular packets, but it is reported for the first time that packet(15) is missing. It thus stays in the retransmission round and retransmits packet(15).

Figure 9:
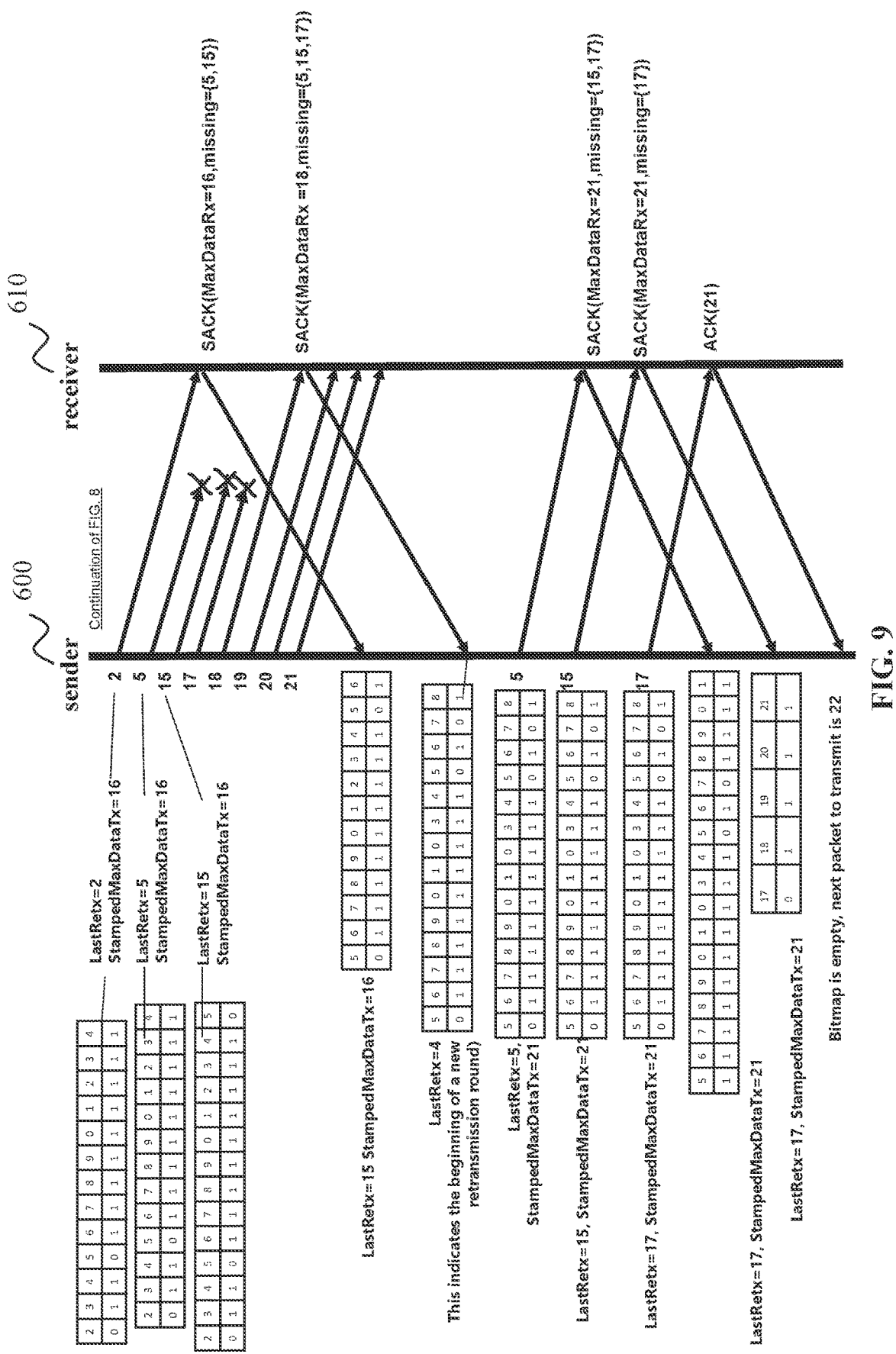
FIG. 9 shows an example of LERP according to an embodiment of the disclosure.

FIG. 9 continues the above example shown in FIG. 8. The first three shown packets (i.e., packet(2), packet(5), and packet(15)) are the last ones from FIG. 8. In this example, after packet(21) is sent, there are no more new packets to send. The SACK for packet 18 is received, and this SACK says that packet(18) have been correctly received. Since StampedMaxDataTx=16 and 18>16, the sender enters a new retransmission round. The sender is also notified, for the first time, about a loss of packet(17). The sender enters a new retransmission round, and retransmits packet(5), then packet(15) and finally packet(17). All these packets are successfully received, the receiver responds with an ACK(21) and the protocol can stop.

Figure 10:
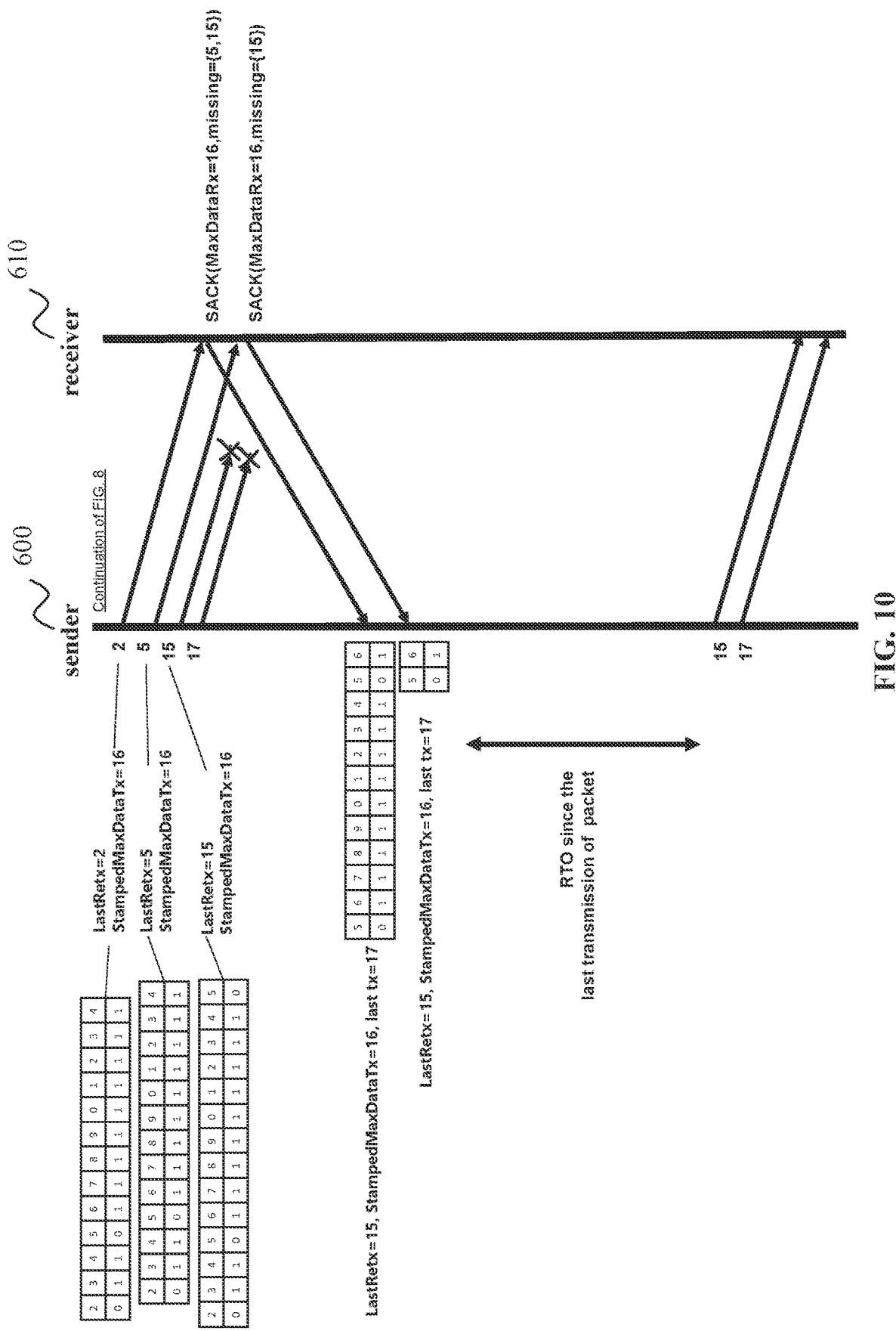
FIG. 10 shows an example of LERP according to an embodiment of the disclosure.

FIG. 10 shows a different way to continue the example from FIG. 8. The first three shown packets (i.e., packet(2), packet(5), and packet(15)) are the last ones from FIG. 8. Here it is assumed that packet(17) is the last to be sent. That is, in this example, after packet(17) is sent, there are no more new packets to send. This creates a problem for the sender, because it is not informed that a packet whose sequence number is greater than StampedMaxDataTx=16 has been accepted. A way for the sender to decide that a new retransmission round should be started is using a time-out. Whenever it transmits a packet, old or new, the sender restarts the timer. This timer expires after a retransmission time out (RTO). The RTO is set to a value greater than RTT. There are many algorithms for estimating RTT, it is not limited here in this disclosure. When the timer expires, the sender retransmits all the packets for which an ACK has not been received so far, namely, packet(16) and packet(17).

Optionally, the setting of the RTO can be prevented by sending an empty packet, with a new sequence number after retransmissions, if no new data exist.

It should be noted that the sender and the receiver shown in one of the FIG. 7 to FIG. 10 may be the first network device 600 and the second network device 610 as shown in FIG. 6, respectively.

To simplify the description, it may be assumed that the sender has a bitmap that indicates the status of every outstanding packet (i.e., every transmitted packet that was not confirmed by the receiver). In practice, when the sender is in NORMAL state, i.e., "a regular round" where new packets are transmitted, there is no need to hold a bitmap until the receiver reports about a new detected gap. Notably, a gap occurs when the packets are not contiguous, i.e., when there is a missing packet.

According to an embodiment of the disclosure, the first network device 600 may be configured to maintain a first data structure that is indicative of the missing data packets that are indicated by the at least one notification message 602. Accordingly, the first network device 600 may be further configured to update the first data structure in response to the at least one notification message 602.

Further, the first network device 600 may be configured to maintain a second data structure that is indicative of to-be-retransmitted data packets; and remove a to-be-retransmitted data packet from the second data structure after retransmitting the to-be-retransmitted data packet.

Optionally, the first network device 600 may be further configured to add the one or more data packets into the second data structure, if the one or more data packets are indicated as missing data packets after its first transmission by the at least one notification message 602, and the sequence number X of the each missing data packet 603 is less than L−K.

Possibly, the first network device 600 may be further configured to add the one or more data packets into the second data structure, if the following conditions are fulfilled:

the one or more data packets 603 have been retransmitted,
a further notification message is received by the first network device 600, wherein the further notification message is indicative of the one or more data packets 603 still being missing at the second network device 610,
the further notification message is also indicative of a further data packet that has been received at the second network device 610, wherein the further data packet was sent for the first time after the last retransmission of the one or more data packets 603, and
the further data packet indicated by the further notification message has a sequence number that is not less than Y+K, wherein Y is a sequence number of a first data packet that is sent for the first time after the last retransmission of the one or more data packets 603.

According to embodiments of this disclosure, at the sender side, the first network device 600 transmits data packets and receive ACK/NACK and/or SACK messages. The first network device 600 has two states: NORMAL and RECOVERY. NORMAL state is when the bitmap does not have any indication for lost packets. RECOVERY state is when reassembly bitmap has at least one reported lost packet.

In particular, the first network device 600 may be configured with five variables: State, Maximum In-Order Received (MaxIORx), Last Retransmitted (LastRetx), Stamped Maximum Data Tx (StampedMaxDataTx) and the parameter K. MaxIORx holds the largest PSN of the confirmed packets received in-order by the receiver, i.e., the second network device 610. This is the PSN of the packet right before the earliest reported lost one. LastRetx holds the PSN of the last retransmitted packet. StampedMaxDataTx holds the largest PSN of transmitted packets when a retransmit is performed. Notably, LastRetx and StampedMaxDataTx are updated at the same time, when the first network device 600 retransmits a packet.

In a particular embodiment, the first network device 600 transmits packets with PSN=498/499/500, then retransmits a packet with PSN=20, and then transmits packets with PSN=501/502. In this case, LastRetx=20, and StampedMaxDataTx=500.

At the sender side, an algorithm according to embodiments of this disclosure is as following:
1. When RTO expires:
   a. Set LastRetx←MaxIORx
   b. Set state←RECOVERY
2. When a packet can be transmitted:
   a. If state=NORMAL, then transmit next in-order packet.
   b. Else (that is, state is RECOVERY), if there is a lost packet with PSN>LastRetx, then:
      i. Retransmit this packet.
      ii. Update LastRetx to the PSN of the retransmitted packet.
      iii. If needed, update StampedMaxDataTx to the PSN of currently largest PSN that was transmitted.
   c. Else (that is, state is RECOVERY but all known lost packets have been retransmitted in the last retransmission round, so there is no lost packet with PSN>LastRetx), transmit next in-order packet (as done in NORMAL state).
3. When an ACK is received (this happens when the receiver has no gap in the sequence numbers), which indicates that all the packets up to ACK.PSN have been received.
   a. Set state←NORMAL (an ACK indicates that there is no missing packet)
   b. Update bitmap
   c. Update MaxIORx
4. When a SACK is received (SACK may contain ACKs and NACKs):
   a. state←RECOVERY.
   b. Update bitmap. If the SACK reports about missing packets that are currently not in the sender's bitmap, add to the bitmap only packets whose PSN fulfils: PSN SACK.MaxDataRx
   c. If (StampedMaxDataTx)<SACK.MaxDataRx, then reset LastRetx=MaxIORx.

According to embodiments of this disclosure, at the receiver side, the second network device 610 receives data packets and transmits ACK/NACK and/or SACK messages. The first network device 600 may be configured with two variables: ExpectedPSN, and MaxDataRx. In particular, ExpectedPSN holds the PSN of the next In-Order packet. It is also the minimum (first) PSN out of all lost packets. MaxDataRx: holds the largest PSN ever received by the receiver.

Figure 11:
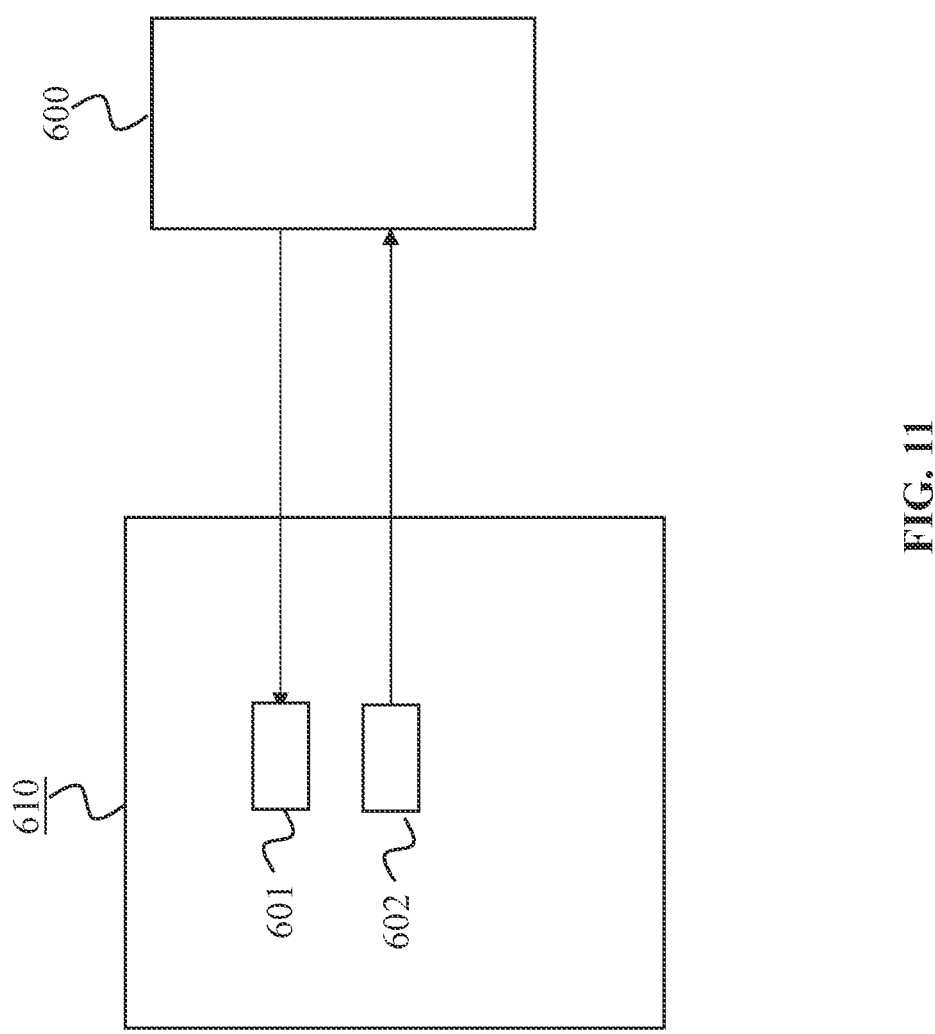
FIG. 11 shows a second network device according to an embodiment of the disclosure.

FIG. 11 shows a second network device 610 according to an embodiment of the disclosure. The second network device 610 may comprise processing circuitry (not shown) configured to perform, conduct or initiate the various operations of the second network device 610 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The second network device 610 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the second network device 610 to be performed. In one embodiment, the processing circuitry comprises one or more processors and a non-transitory memory connected to the one or more processors. The non-transitory memory may carry executable program code which, when executed by the one or more processors, causes the second network device 610 to perform, conduct or initiate the operations or methods described herein.

In particular, the second network device 610 is configured to receive a sequence of data packets 601 from a first network device 600. Then, the second network device 610 is further configured to transmit at least one notification message 602, to the first network device 600, wherein the at least one notification message 602 is indicative of the largest sequence number L of a data packet among sequence numbers of data packets that have been received at the second network device 610 and one or more data packets 603 of the sequence of data packets that are missing at the second network device 610 up to the largest sequence number L.

In a particular embodiment, upon receiving a new packet whose number is PSN, which was never received, the second network device 610 may update a bitmap at the receiver sider. In particular, if PSN>MaxDataRx, the second network device 610 may set MaxDataRx with the value of PSN. If PSN=ExpectedPSN, the second network device 610 may update ExpectedPSN. If MaxDataRx>ExpectedPSN−1 (there is a missing packet), the second network device 610 may send a SACK, otherwise it may send an ACK.

It is worth mentioning that to save bandwidth, it is possible for the second network device 610 not to send an ACK or a SACK for every received packet. For example, the receiver can maintain a counter and send an ACK or a SACK after receiving N packets, where N≥1. In such a case, the receiver should also have a timer, which triggers the transmission of an ACK/SACK if N packets are not received within a time-out period.

Optionally, the second network device 610 may be further configured to transmit the at least one notification message 602 to the first network device 600, when a timer expires.

Notably, traffic is bidirectional, and thus each endpoint is both a sender and a receiver. Possibly, the first network device 600 shown in FIG. 6 may be the second network device 610 shown in FIG. 11 in a specific implementation.

Further, it should be noted that the algorithm as described in the previous embodiments makes a hidden assumption that packets are routed in order. For example, as shown in FIG. 8, when packet(4) is received after packet(1), the receiver assumes that packet(2) and packet(3) are lost. This is because that if these packets are not lost, they should have been received before packet(4). But if packets are not necessarily routed over the same path, it is possible that packet(2) and/or packet(3) will be received after packet(4).

Another example is when the sender receives an ACK for packet number StampedMaxDataTx, and assumes that all retransmitted packets should have been received before this packet. This assumption holds only if the network guarantees in-order packet routing.

However, in some cases, the network does not necessarily ensure in-order packet routing. The LERP as proposed in this disclosure can also apply for such cases. For a modified version of LERP, the sender maintains a variable K, which indicates an out-of-order distance, i.e., how many packets can bypass a certain packet when they are all sent from the sender to the receiver.

For instance, there are two packet: packet(i) and packet(j), where i>j. That is, the sender sends packet(j) before packet (i), however, the receiver receives packet(i) before packet(j). It is defined that the out-of-order distance as i−j. For example, if packet(6) is received before packet(4), then the out-of-order distance is 2. This means that a packet has bypassed two previously sent packets.

It should be noted that, it is assumed that data packets can be received out-of-order, but there is a maximum distance between every two out-of-order received packets. The value of the maximum distance is the variable K, where K≥0. K=0 is the special case where packets are always received in order. In a case that a receiver receives packet(2) and then packet(6), if K=2, it is possible for packet(6) to be received before packet(4) and packet(5), but not before packet(3). Therefore, the receiver can determine that packet(3) has been lost. However, if K=3, when receiving packet(6), the receiver cannot decide yet whether packet(3) or packet(4) or packet(5) is lost.

Figure 12:
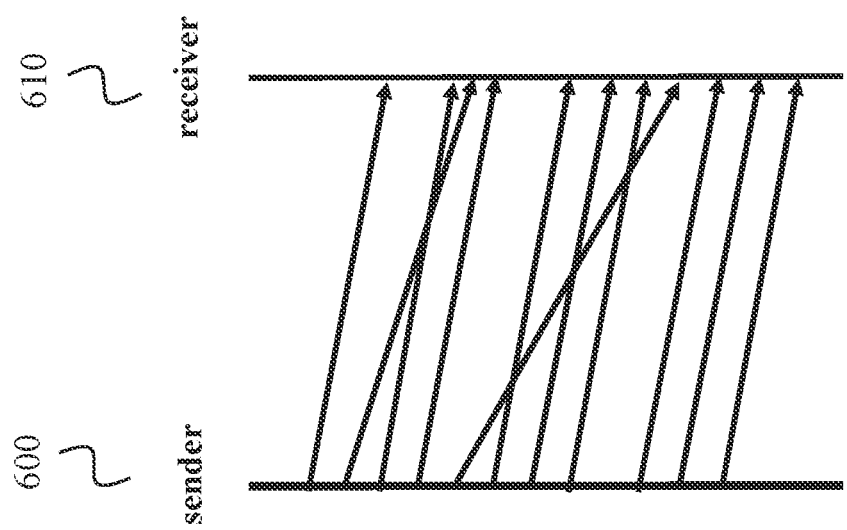
FIG. 12 shows an example where in-order delivery is not guaranteed.

In all the examples discussed in FIG. 8 to FIG. 10, the variable K was equal to 0. But as shown in FIG. 12, we see that the second packet is received after the third one (K=1) and that the 5th packet is received after the 8th one (K=3). Thus, in this example K=3 holds.

With respect to the above discussed embodiments shown in FIG. 8 to FIG. 10, in order to address the out-of-order cases where K>0, two changes may be needed in the sender's algorithm, and no change is required in the receiver's algorithm. Changes may be done in step 4 of the sender's algorithm, which may be modified as follows:

4. When a SACK is received (SACK reports about missing packets):
  d. state←RECOVERY.
  e. Update bitmap. If the SACK reports about missing packets that are currently not in the sender's bitmap, add to the bitmap only packets whose PSN fulfils: (PSN≤SACK.MaxDataRx−K)
  f. If (StampedMaxDataTx+K)<SACK.MaxDataRx, then reset LastRetx=MaxIORx.

Optionally, the parameter K may be negotiated during a connection setup. For instance, K may be negotiated during the connection setup between the first network device 600 and the second network device 610. Alternatively, the parameter K may also be negotiated during a connection setup between the first network device 600/the second network device 610 and another network device such as a network controller. The parameter K may be a static parameter, or a dynamic parameter. Notably, the parameter K may be a fixed number. Alternatively, the parameter K may be a dynamically updated number, which may be notified to both of the sender and receiver upon change.

The algorithm as previously described in embodiments of this disclosure uses both ACK and SACK messages. But it can also be implemented without using ACKs, because SACK is a generalization of ACK. The algorithm decouples between transmission control and flow control. For simplicity, it assumes that a receiver's bitmap is maintained to cover all outstanding packets. However, the algorithm can be extended to also implement a flow control mechanism in order to ensure that the sender does not send packets for which bitmap resources (or other resources) are not available at the receiver. The algorithm decouples between congestion control and flow control. Thus, it can be implemented together with almost every congestion control algorithm. In particular, congestion control information can be carried in the SACK and ACK messages. The algorithm relies on an RTO mechanism. An RTO mechanism may include estimating the RTT. Information for RTT estimation can be integrated into the data packets, SACKs and ACKs.

Figure 13:
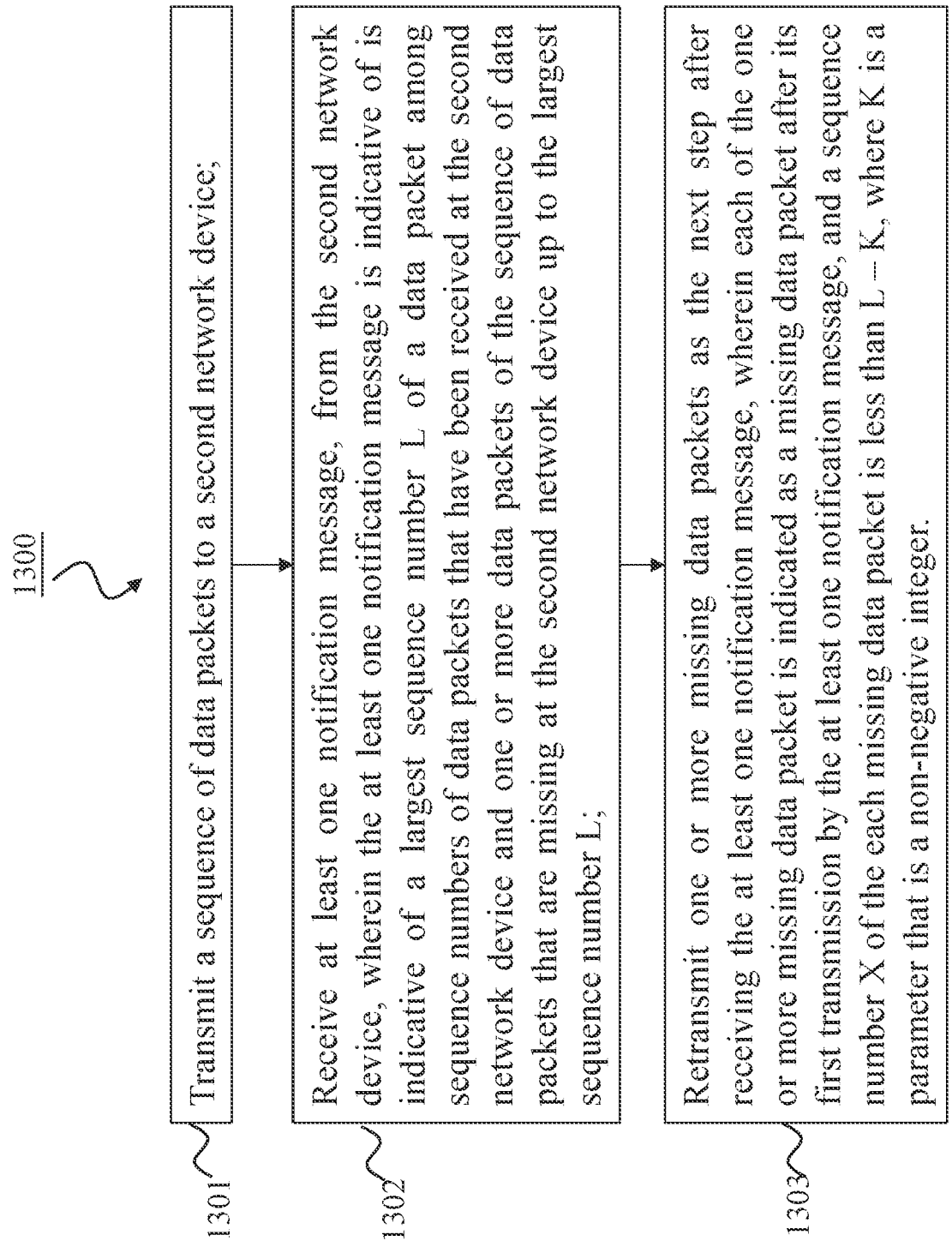
FIG. 13 shows a method according to an embodiment of the disclosure.

FIG. 13 shows a method 1300 according to an embodiment of the disclosure. In a particular embodiment of the disclosure, the method 1300 is performed by a first network device 600 shown in FIG. 6. The method 1300 comprises: a step 1301 of transmitting a sequence of data packets 601 to a second network device 610; a step 1302 of receiving at least one notification message 602, from the second network device 610, wherein the at least one notification message 602 is indicative of a largest sequence number L of a data packet among sequence numbers of data packets that have been received at the second network device 610 and one or more data packets 603 of the sequence of data packets that are missing at the second network device 610 up to the largest sequence number L; and a step 1303 of retransmitting the missing one or more data packets 603 as the next step after receiving the at least one notification message 602, wherein each of the one or more missing data packet 603 is indicated as a missing data packet after its first transmission by the at least one notification message 602, and a sequence number X of the each missing data packet 603 is less than L−K, where K is a parameter that is a non-negative integer. Possibly, the second network device 610 is the second network device shown in FIG. 6 or FIG. 11.

FIG. 14 shows a method 1400 according to an embodiment of the disclosure. In a particular embodiment of the disclosure, the method 1400 is performed by a second network device 610 shown in FIG. 11. The method 1400 comprises: a step 1401 of receiving a sequence of data packets 601 from a first network device 600; and a step 1402 of transmitting at least one notification message 602 to the first network device 600, wherein the at least one notification message 602 is indicative of the largest sequence number L of a data packet among sequence numbers of data packets that have been received at the second network device 610 and one or more data packets 603 of the sequence of data packets that are missing at the second network device 610 up to the largest sequence number L. Possibly, the first network device 600 is the first network device shown in FIG. 6 or FIG. 11.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first network device 600 and the second network device 610, respectively, comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the first network device 600 and the second network device 610, respectively, may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A first network device, comprising:
processing circuitry configured to operate in a first state and in a second state, the processing circuitry being configured to:
transmit a sequence of data packets to a second network device;
receive, from the second network device, at least one notification message indicative of:
a largest sequence number L of a data packet among sequence numbers of data packets that have been received at the second network device, and
one or more missing data packets that are missing from the sequence of data packets at the second network device up to the largest sequence number L; and
retransmit the one or more missing data packets as a next step after receiving the at least one notification message, wherein each respective missing data packet of the one or more missing data packets is indicated as a missing data packet after its first transmission by the at least one notification message, and wherein a sequence number X of each respective missing data packet of the one or more missing data packets is less than L−K, wherein K is a parameter that is a non-negative integer;
maintain a first data structure indicative of the one or more missing data packets that are indicated by the at least one notification message;
update the first data structure in response to the at least one notification message;

maintain a second data structure that is indicative of to-be-retransmitted data packets;
add the one or more missing data packets that are indicated by the at least one notification message into the second data structure; and
remove a to-be-retransmitted data packet from the second data structure after retransmitting the to-be-retransmitted data packet,
wherein in the first state, the processing circuitry is configured to:
transmit new data packets, and
enter the second state based on the second data structure being not empty and/or stay in the first state based on the second data structure being empty, and
wherein in the second state, the processing circuitry is configured to retransmit to-be-retransmitted data packets according to the second data structure.

2. The first network device according to claim 1, wherein the processing circuitry is further configured to: add one or more respective missing data packets of the one or more missing data packets again into the second data structure, in response to the following conditions being fulfilled: the one or more respective missing data packets have been retransmitted, a further notification message is received by the first network device, wherein the further notification message indicates that the one or more respective missing data packets are still missing at the second network device, the further notification message indicates a further data packet that has been received at the second network device, wherein the further data packet was sent for the first time after the last retransmission of the one or more missing data packets, and the further data packet indicated by the further notification message has a sequence number that is not less than Y+K, wherein Y is a sequence number of a first data packet that is sent for the first time after the last retransmission of the one or more data packets.

3. The first network device according to claim 1, wherein in the second state, the processing circuitry is configured to:
enter the first state based on the second data structure being empty, and/or
stay in the second state based on the second data structure being not empty.

4. The first network device according to claim 1, wherein the processing circuitry is further configured to:
use a timer and set the timer when transmitting a new data packet and/or when retransmitting a missing data packet; and
add, when the time expires, all data packets for which an acknowledgment was not received to the second data structure.

5. The first network device according to claim 4, wherein the processing circuitry is further configured to set the timer with a value greater than a round trip time.

6. A second network device, comprising:
processing circuitry configured to:
receive a sequence of data packets from a first network device;
transmit, to the first network device, at least one notification message indicative of the largest sequence number L of a data packet among sequence numbers of data packets that have been received at the second network device and one or more missing data packets of the sequence of data packets up to the largest sequence number L that are missing at the second network device; and
receive one or more missing data packets after transmitting the at least one notification message, wherein each of the one or more missing data packets is indicated as a missing data packet by the at least one notification message, and a sequence number X of the each respective missing data packet of the one or more missing data packets is less than L−K, wherein K is a parameter that is a non-negative integer,
wherein the first network device is configured to:
maintain a first data structure indicative of the one or more missing data packets that are indicated by the at least one notification message,
update the first data structure in response to the at least one notification message,
maintain a second data structure that is indicative of to-be-retransmitted data packets,
add the one or more missing data packets that are indicated by the at least one notification message into the second data structure, and
remove a to-be-retransmitted data packet from the second data structure after retransmitting the to-be-retransmitted data packet,
wherein the first network device is configured to operate in a first state and a second state,
wherein, in the first state, the first network device is configured to:
transmit new data packets, and
enter the second state based on the second data structure being not empty and/or stay in the first state based on the second data structure being empty, and
wherein in the second state, the first network device is configured to retransmit to-be-retransmitted data packets according to the second data structure.

7. The second network device according to claim 6, wherein the processing circuitry is further configured to:
transmit, when a timer expires, the at least one notification message for each of the one or more missing data packets to the first network device.

8. A method, performed by a first network device, the method comprising:
transmitting a sequence of data packets to a second network device;
receiving, from the second network device, at least one notification message indicative of:
a largest sequence number L of a data packet among sequence numbers of data packets that have been received at the second network device, and
one or more missing data packets that are missing from the sequence of data packets at the second network device up to the largest sequence number L; and
retransmitting one or more missing data packets as the next step after receiving the at least one notification message, wherein each of the one or more missing data packets is indicated as a missing data packet after its first transmission by the at least one notification message, and a sequence number X of the each respective missing data packet of the one or more missing data packets is less than L−K, wherein K is a parameter that is a non-negative integer,
maintaining a first data structure indicative of the one or more missing data packets that are indicated by the at least one notification message;
updating the first data structure in response to the at least one notification message;
maintaining a second data structure that is indicative of to-be-retransmitted data packets;
adding the one or more missing data packets that are indicated by the at least one notification message into the second data structure; and removing a to-be-retransmitted data packet from the second data structure after retransmitting the to-be-retransmitted data packet, wherein the method further comprises operating in a first state and a second state, wherein, in the first state, the method further comprises:
transmitting new data packets, and
entering the second state based on the second data structure being not empty and/or staying in the first state based on the second data structure being empty, and wherein in the second state, the method further comprises retransmitting the to-be-retransmitted data packets according to the second data structure.

9. A method, performed by a second network device, the method comprising:

receiving a sequence of data packets from a first network device; and transmitting, to the first network device, at least one notification message indicative of the largest sequence number L of a data packet among sequence numbers of data packets that have been received at the second network device and one or more missing data packets of the sequence of data packets up to the largest sequence number L that are missing at the second network device; and receiving one or more missing data packets after transmitting the at least one notification message, wherein each of the one or more missing data packets is indicated as a missing data packet by the at least one notification message, and a sequence number X of the each respective missing data packet of the one or more missing data packets is less than L–K, wherein K is a parameter that is a non-negative integer, wherein the first network device is configured to:
maintain a first data structure indicative of the one or more missing data packets that are indicated by the at least one notification message,
update the first data structure in response to the at least one notification message,
maintain a second data structure that is indicative of to-be-retransmitted data packets,
add the one or more missing data packets that are indicated by the at least one notification message into the second data structure, and
remove a to-be-retransmitted data packet from the second data structure after retransmitting the to-be-retransmitted data packet, wherein the first network device is configured to operate in a first state and a second state, wherein, in the first state, the first network device is configured to:
transmit new data packets, and
enter the second state based on the second data structure being not empty and/or stay in the first state based on the second data structure being empty, and wherein in the second state, the first network device is configured to retransmit to-be-retransmitted data packets according to the second data structure.

10. A non-transitory processor readable medium having stored thereon program code comprising instructions that, when executed by a processor, cause the processor to carry out the method according to claim 8.

11. A non-transitory processor readable medium having stored thereon program code comprising instructions that, when executed by a processor, cause the processor to carry out the method according to claim 9.

* * * * *